US006771656B1

(12) United States Patent
Yoshihara

(10) Patent No.: US 6,771,656 B1
(45) Date of Patent: Aug. 3, 2004

(54) COMMUNICATION RIGHT DETERMINATION METHOD, INFORMATION PROCESSING APPARATUS USE THEREFOR, AND COMPUTER-READABLE RECORDING MEDIUM RECORDED WITH PROGRAM FOR CARRYING OUT THE METHOD

(75) Inventor: Michio Yoshihara, Gunma (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/225,769

(22) Filed: Jan. 5, 1999

(30) Foreign Application Priority Data

Mar. 10, 1998 (JP) .......................................... 10-058411

(51) Int. Cl.$^7$ ............................................. H04L 12/413
(52) U.S. Cl. ........................ 370/449; 370/461; 370/462
(58) Field of Search ................................ 370/449, 451, 370/450, 322, 348, 462, 346, 461, 463; 340/3.51

(56) References Cited

U.S. PATENT DOCUMENTS

| | | | | |
|---|---|---|---|---|
| 4,466,001 A | * | 8/1984 | Moore et al. | 340/825.52 |
| 4,667,193 A | * | 5/1987 | Cotie et al. | 340/825.52 |
| 4,847,834 A | * | 7/1989 | Bryant | 370/449 |
| 5,130,983 A | * | 7/1992 | Heffner, III | 370/449 |
| 5,373,503 A | * | 12/1994 | Chen | 370/346 |
| 5,434,861 A | * | 7/1995 | Pritty et al. | 370/449 |
| 5,539,882 A | * | 7/1996 | Gopal et al. | 370/449 |
| 6,006,017 A | * | 12/1999 | Joshi et al. | 709/224 |

FOREIGN PATENT DOCUMENTS

| | | |
|---|---|---|
| JP | 63-299627 | 12/1988 |
| JP | 5-176378 | 7/1993 |
| JP | 9-266489 | 10/1997 |

* cited by examiner

*Primary Examiner*—Chau Nguyen
*Assistant Examiner*—Soon-Dong Hyun
(74) *Attorney, Agent, or Firm*—Katten Muchin Zavis Rosenman

(57) ABSTRACT

A communication right determination method determines a right to communicate between a host unit and a plurality of terminal equipments coupled to the host unit. The communication right determination method includes the steps of (a) transmitting polling information from the host unit simultaneously to the terminal equipments, (b) transmitting connection response information from the terminal equipments to the host unit at times which are different for each of the terminal equipments depending on the polling data received from the host unit, and (c) establishing a communication between the host unit and a predetermined terminal equipment from among the terminal equipments depending on the connection response information which is received from each of the terminal equipments.

14 Claims, 13 Drawing Sheets

| 01 | 02 | 03 | 04 | 05 | 06 |
|----|----|----|----|----|----|
| 50 | 81 | 01 | 10 | FF | FF |

CONNECTION CONFIRMATION DATA FORMAT

| 01 | 02 | 03 | 04 | 05 | 06 |
|----|----|----|----|----|----|
| 4C | 81 | XX | YY | FF | FF |

RESPONSE TIME DATA

FIG. 10

RESPONSE DATA FORMAT

| 01 | 02 | 03 | 04 | 05 | 06 |
|----|----|----|----|----|----|
| 52 | 81 | XX | YY | FF | FF |

RESPONSE TIME DATA (columns 03–04)

F I G. 1 2
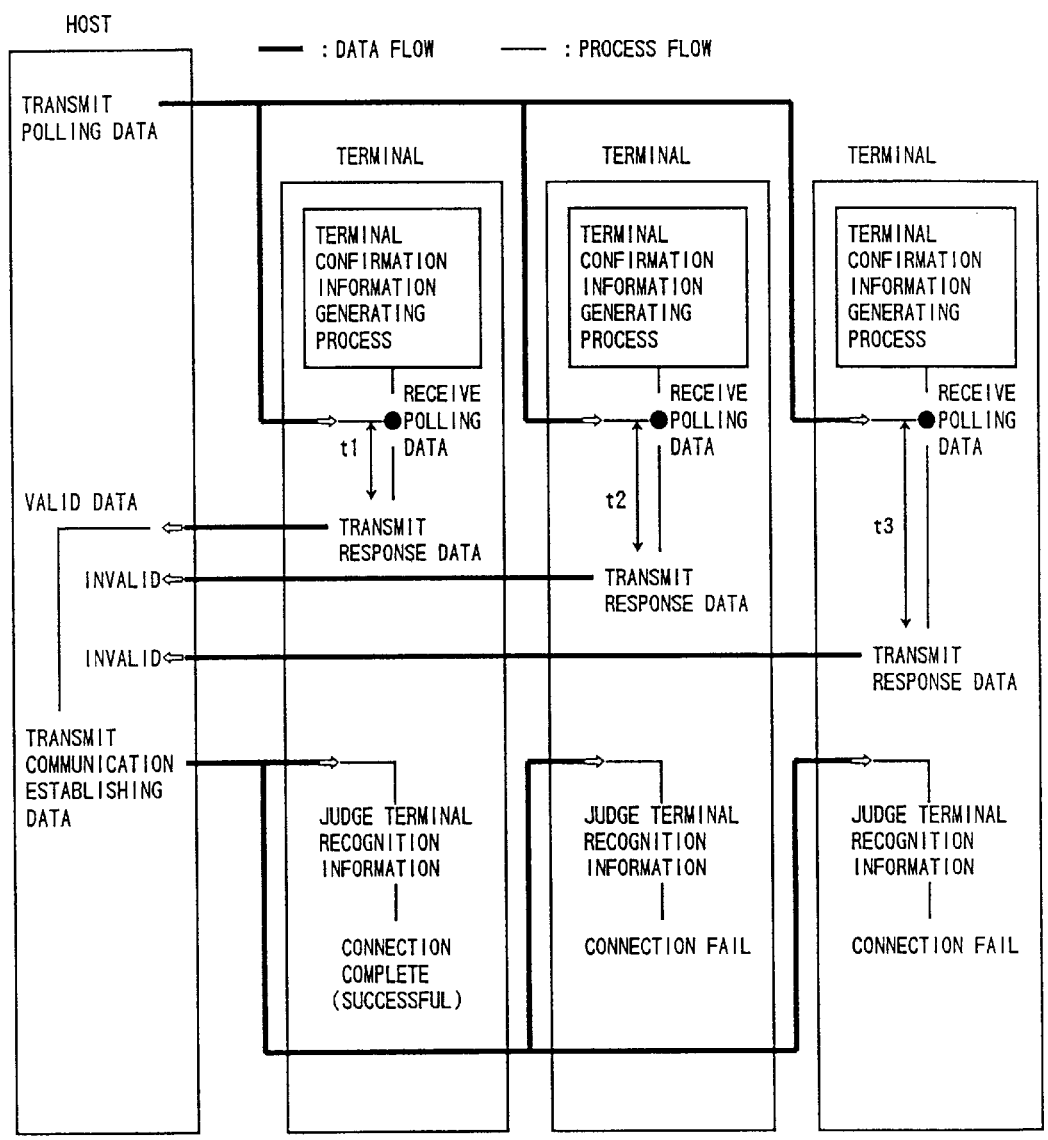

COMMUNICATION RIGHT DETERMINATION METHOD, INFORMATION PROCESSING APPARATUS USE THEREFOR, AND COMPUTER-READABLE RECORDING MEDIUM RECORDED WITH PROGRAM FOR CARRYING OUT THE METHOD

BACKGROUND OF THE INVENTION

The present invention generally relates to communication right determination methods, information processing apparatuses and computer-readable recording mediums, and more particularly to a communication right determination method for determining a right to make a communication among a host computer and a plurality of terminal equipments, an information processing apparatus which uses the communication right determination method, and a computer-readable recording medium which is recorded with a program for carrying out the communication right determination method.

When making a data communication among a host computer and a plurality of terminal equipments, a communication adapter (hereinafter simply referred to as an adapter) is coupled to each terminal equipment, and the adapters are coupled by a cable while one adapter is selectively coupled to the host computer. The terminal equipment confirms from a signal line a connection state of the host computer and the other terminal equipments, and makes a communication in a state where the other terminal equipments are not making a communication.

According to the above described method, the adapter must be provided with a means for confirming and judging a state of the signal line. As a result, the cost of the adapter becomes high.

As another method of determining the right to make a communication, there is a method which adds identification (ID) numbers to the plurality of terminal equipments. The ID numbers are managed by the host computer, and a polling is successively made to the plurality of terminal equipments using the ID numbers, so as to determine the right to make a communication. However, according to this method, it takes time to make the communication because the polling must successively be made to the plurality of terminal equipments.

Therefore, there are demands to realize a communication right determination method which can be realized with ease at a low cost.

FIG. 1 is a diagram showing a first example of a conventional system. In this conventional system, a host computer 93 makers a data communication with a plurality of terminal equipments 91-1 through 91-N. A communication adapter 92 is provided with respect to each of the terminal equipments 91-1 through 91-N, and the host computer 93 and the terminal equipments 91-1 through 91-N are coupled by cables 94 in a daisy-chain.

When the terminal equipments 91-1 through 91-N communicate with the host computer 93, the adapter 92 detects the state of the signal on the cable 94, and makes a connection to the host computer 93 if there is no other terminal equipment in use.

On the other hand, the plurality of terminal equipments and the host computer can be coupled by assigning arbitrary ID numbers to each of the terminal equipments. In this case, the host computer can successively carry out a polling with respect to the terminal equipments using the ID numbers.

FIG. 2 is a diagram for explaining the operation of a second example of the conventional system which uses such ID numbers.

In a communication system shown in FIG. 2, a host computer 101 supplies a polling data to a terminal equipment 102-1 having an ID number "001". If no request is generated in the terminal equipment 102-1 to make a communication with the host computer 101 when the polling data is supplied from the host computer 101, the terminal equipment 102-1 responds to the host computer 101 by returning a communication denial data as a response data.

The host computer 101 receives and analyzes the response data from the terminal equipment 102-1. If the analyzed response data is the communication denial data, the host computer 101 supplies the polling data to the terminal equipment having the next ID number, and the above described operation is repeated in a similar manner.

For example, if the response data from the terminal equipment 102-N is a communication acknowledge data, the host computer 101 communicates with the terminal equipment 102-N by carrying out a data communication process. During this time when the host computer 101 communicates with the terminal equipment 102-N, the polling data is not supplies to any of the terminals 102-1 through 102-N.

When the communication between the host computer 101 and the terminal 102-N ends, the host computer 101 again successively supplies the polling data to the terminal equipments 102-1 through 102-N starting from the terminal equipment 102-1 having the first ID number "001", and operations similar to that described above are repeated.

However, according to the first example which detects the state of the signal line at the communication adapters coupled in the daisy-chain as shown in FIG. 1, confirms the communication state, and makes the communication only when no communication is made, it is necessary to provide in the communication adapters a hardware for detecting the state of the signal line. As a result, there is a problem in that the cost of the communication adapter, and thus, the communication system, increases.

On the other hand, according to the second example which assigns the arbitrary ID numbers to the terminal equipments and successively makes the polling with respect to the terminal equipments using the ID numbers as shown in FIG. 2, the ID number must be assigned to each of the terminal equipments, and the host computer must manage the ID numbers. Hence, there were problems in that the process becomes complex at both the terminal equipments and the host computer.

In addition, since the second example makes the polling from the host computer using the ID number with respect to each terminal equipment which is coupled to the host computer, there is another problem in that it takes time for the communications of all of the terminal equipments to end when a relatively large number of terminal equipments are coupled to the host computer.

SUMMARY OF THE INVENTION

Accordingly, it is a general object of the present invention is to provide a novel and useful communication right determination method, information processing apparatus and computer-readable recording medium, in which the problems described above are eliminated.

Another and more specific object of the present invention is to provide a communication right determination method, information processing apparatus and computer-readable recording medium which enable communications to be made at a low cost and within a relatively short communication time under an environment in which a plurality of terminal equipments are coupled to a host computer.

Still another object of the present invention is to provide a communication right determination method for determining a right to communicate between a host unit and a plurality of terminal equipments coupled to the host unit, comprising the steps of (a) transmitting polling information from the host unit simultaneously to the terminal equipments, (b) transmitting connection response information from the terminal equipments to the host unit at times which are different for each of the terminal equipments depending on the polling data received from the host unit, and (c) establishing a communication between the host unit and a predetermined terminal equipment from among the terminal equipments depending on the connection response information which is received from each of the terminal equipments. According to the communication right determination method of the present invention, it is possible to simultaneously transmit the polling information from the host unit to the terminal equipments using the same line, and the responses can be recognized independently at the host unit even when the responses are transmitted from the terminal equipments on the same line. As a result, the line can be simplified in that there is no need to couple the host unit and the terminal equipments using independent lines.

A further object of the present invention is to provide an information processing apparatus which communicates with a plurality off terminal equipments, comprising a polling information transmitting unit which transmits polling information simultaneously to the terminal equipments, and a communication establishing unit which establishes a communication between the information processing apparatus and a predetermined terminal equipment from among the terminal equipments depending on connection response information which is received from each of the terminal equipments in response to the polling information. According to the information processing apparatus of the present invention, the information processing apparatus, that is, a host unit, simply needs to simultaneously transmit the polling information to the terminal equipments when establishing the communication, without the need to transmit the polling information by distinguishing the terminal equipments. For this reason, it is unnecessary to manage the connection state and the like of the terminal equipments, and the information management at the host unit can be simplified.

Another object of the present invention is to provide an information processing apparatus which communicates with a host unit, comprising a connection response unit which transmits connection response information to the host unit at a time which is unique to the information processing apparatus in response to polling data received from the host unit, and a communication establishing unit which establishes a communication between the information processing apparatus and the host unit depending on a communication confirmation response which is received from the host unit in response to the connection response information. According to the information processing apparatus of the present invention, the connection response information transmitted from the information processing apparatus, that is, a terminal equipment, will not collide with connection response information transmitted from other terminal equipments which are coupled to the host unit. Hence, it is possible to share the connection between the host unit and a plurality of terminal equipments, thereby simplifying the connection between the plurality of terminal equipments and the host unit.

Still another object of the present invention is to provide a computer-readable recording medium recorded with a program for causing a computer to establish a communication with a plurality of terminal equipments, comprising polling information transmitting means for transmitting polling information simultaneously to the terminal equipments, and communication establishing means for establishing a communication between the computer and a predetermined terminal equipment from among the terminal equipments depending on connection response information which is received from each of the terminal equipments in response to the polling information. According to the computer-readable recording medium of the present invention, the computer, that is, the host unit, simply needs to simultaneously transmit the polling information to the terminal equipments when establishing the communication, without the need to transmit the polling information by distinguishing the terminal equipments. For this reason, it is unnecessary to manage the connection state and the like of the terminal equipments, and the information management at the host unit can be simplified.

A further object of the present invention is to provide a computer-readable recording medium recorded with a program for causing a computer to establish a communication with a host unit, comprising connection response means for transmitting connection response information to the host unit at a time which is unique to the computer in response to polling data received from the host unit, and communication establishing means for establishing a communication between the computer and the host unit depending on a communication confirmation response which is received from the host unit in response to the connection response information. According to the computer-redable recording medium of the present invention, the connection response information transmitted from the computer, that is, a terminal equipment, will not collide with connection response information transmitted from other terminal equipments which are coupled to the host unit. Hence, it is possible to share the connection between the host unit and a plurality of terminal equipments, thereby simplifying the connection between the plurality of terminal equipments and the host unit.

Another object of the present invention is to provide an information processing apparatus comprising a polling information transmitting unit which transmits polling information, and a communication establishing unit which establishes a communication with another information processing apparatus from which a response is received within a shortest time interval from a time when the polling information is transmitted from the polling information transmitting unit. According to the information processing apparatus of the present invention, the information processing apparatus simply needs to transmit the polling information when establishing the communication, without the need to transmit the polling information by distinguishing other information processing apparatuses. For this reason, it is unnecessary to manage the connection state and the like of the information processing apparatuses, and the information management at the information processing apparatus can be simplified.

Still another object of the present invention is to provide an information processing apparatus comprising a connection response unit which transmits connection response information in response to polling data received from another information processing apparatus, where the connection response unit transmits the connection response information after a time interval from a time when the polling data is received from the other information processing apparatus, and the time interval is uniquely set with respect to the information processing apparatus. According to the information processing apparatus of the present invention, the connection response information transmitted from the information processing apparatus will not collide with connection response information transmitted from other information processing apparatuses. Hence, it is possible to share the connection with other information processing apparatuses, thereby simplifying the connection between a plurality of information processing apparatuses.

Other objects and further features of the present invention will be apparent from the following detailed description when read in conjunction with the accompanying drawings.

BRIEF DESCRIPTION OF THE DRAWINGS

FIG. 10 is a diagram showing a data structure of a response data generated by the second embodiment of the information processing apparatus;

FIG. 12 is a diagram for explaining the operation of the embodiment of the communication right determination method;

DESCRIPTION OF THE PREFERRED EMBODIMENTS

Figure 1:
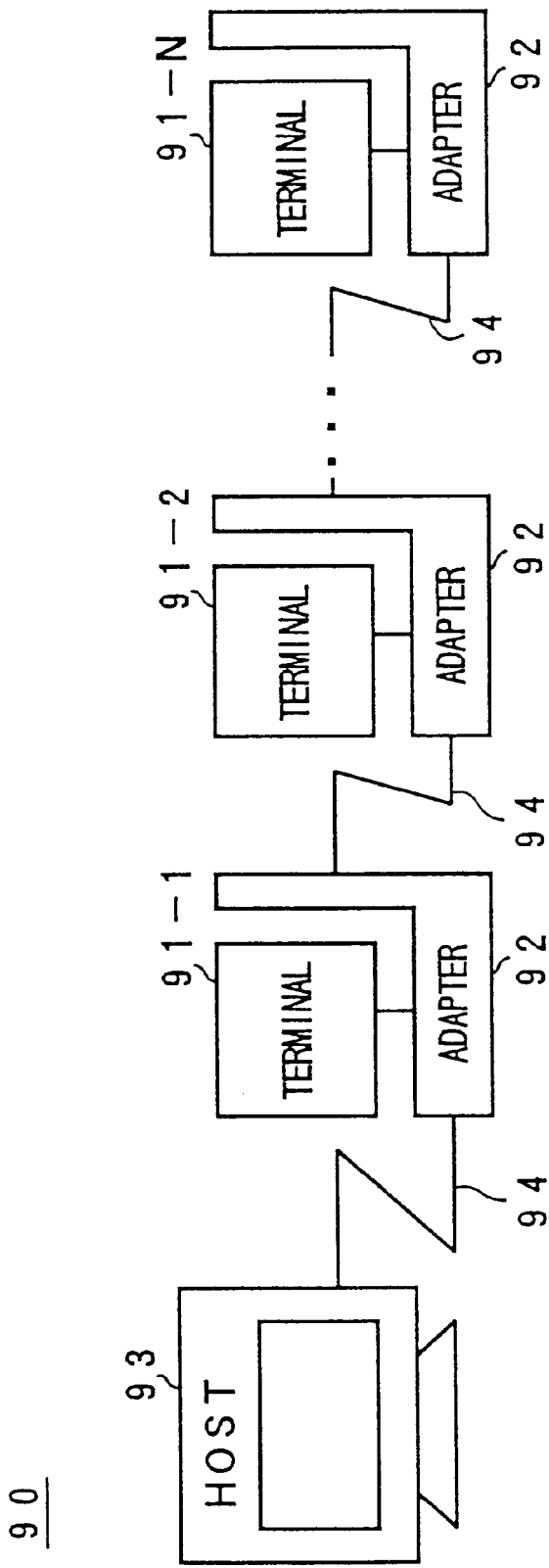
FIG. 1 is a diagram showing a first example of a conventional system.
Figure 2:
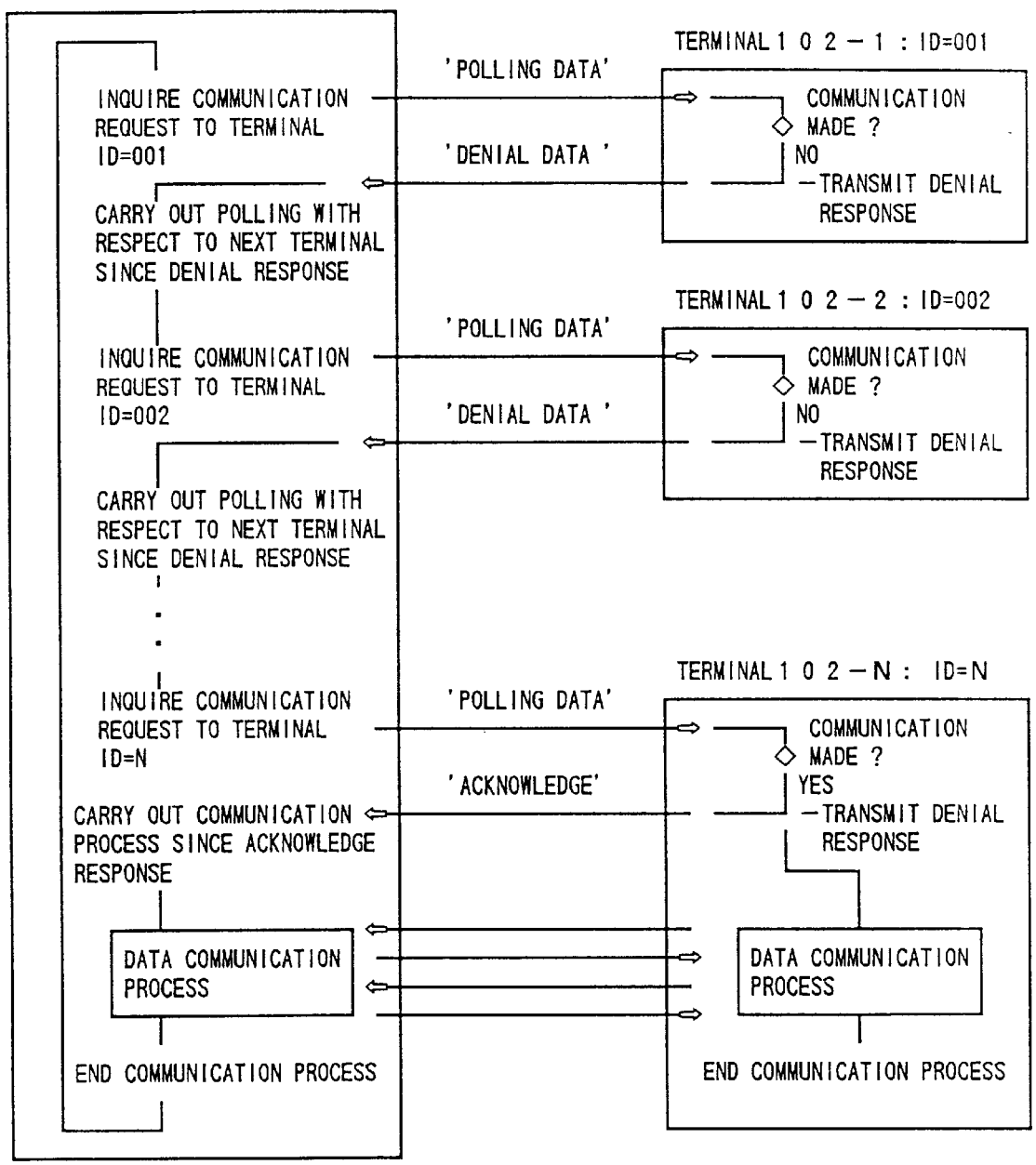
FIG. 2 is a diagram for explaining the operation of a second example of the conventional system which uses ID numbers.
Figure 3:
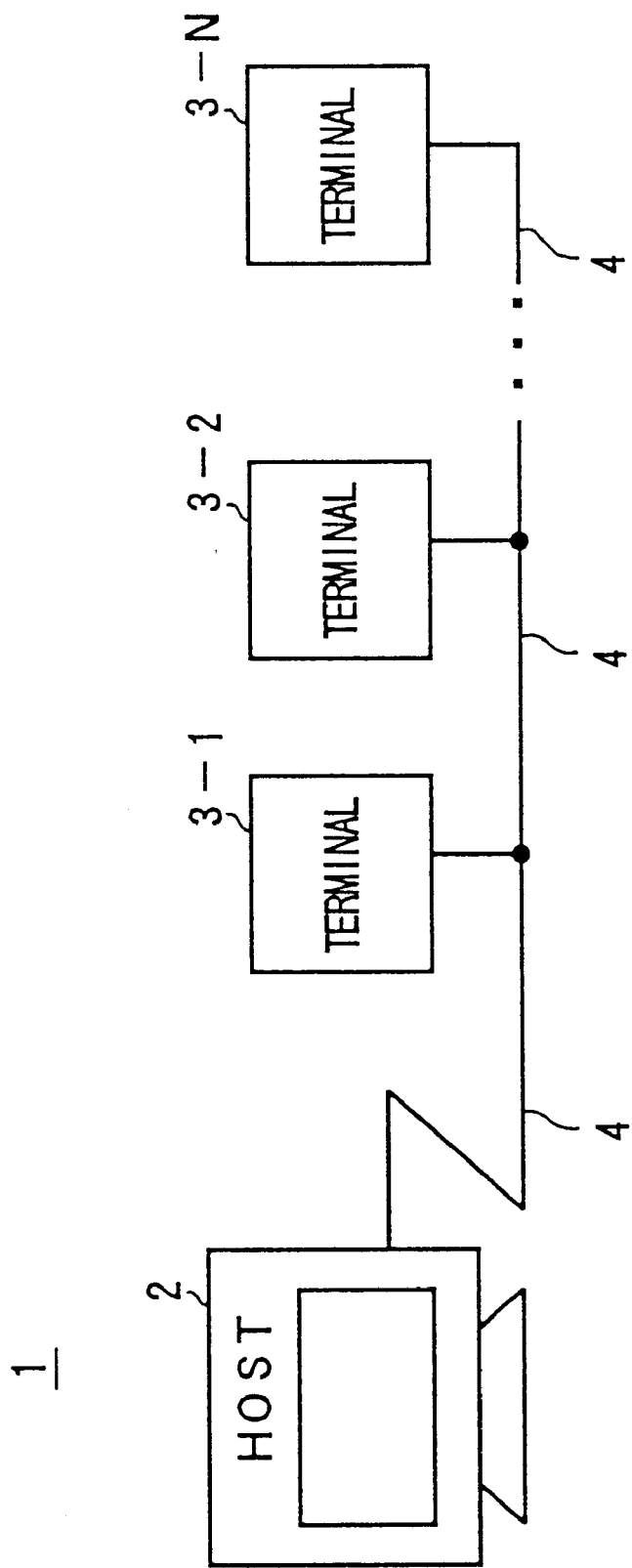
FIG. 3 is a system block diagram showing a communication system applied with a first embodiment of a communication right determination method according to the present invention.

FIG. 3 is a system block diagram showing a communication system applied with a first embodiment of a communication right determination method according to the present invention.

A communication system 1 shown in FIG. 3 includes a host computer 2, and a plurality of terminal equipments 3-1 through 3-N which are coupled by cables 4 as shown.

Figure 4:
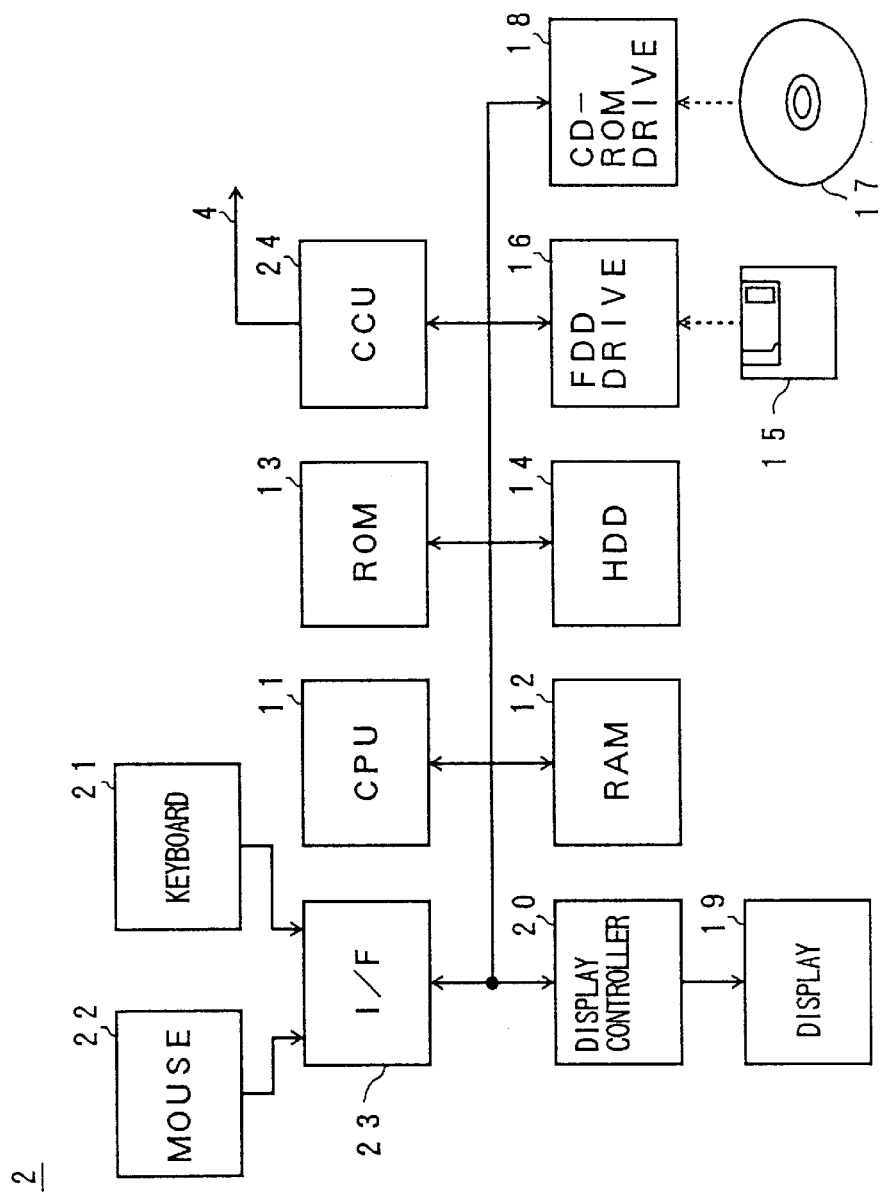
FIG. 4 is a system block diagram showing a first embodiment of an information processing apparatus according to the present invention.

FIG. 4 is a system block diagram showing a first embodiment of an information processing apparatus according to the present invention, that is, the host computer 2.

The host computer 2 includes a central processing unit (CPU) 11, a random access memory (RAM) 12, a read only memory (ROM) 13, a hard disk drive (HDD) 14, a floppy disk drive (FDD) 16, a compact disk ROM drive (CD-ROM drive) 18, a display 19, a display controller, 20, a keyboard 21, a mouse 22, an interface (I/F) 23, and a communication control unit (CCU) 24 which are coupled as shown in FIG. 4.

The CPU 11 carries out computation processes and carries out a general control of the host computer 2. The RAM 12 forms a work storage region of the CPU 11, and the ROM 13 stores BIOS or the like used to start the host computer 2. The HDD 14 includes one or more hard disks storing programs and data. The FDD 16 stores information on and reads information from a floppy disk 15 which is loaded into the FDD 16. The CD-ROM drive 18 reads information recorded on a CD-ROM 17. The display 19 displays processed information under the control of the display controller 20. The keyboard 21 and the mouse 22 are used to input commands, data and the like. The interface 23 couples the keyboard 21 and the mouse 22 to the CPU 11. The CCU 24 couples the host computer 2 to the terminal equipments 3-1 through 3-N, and forms a communication adapter.

For the sake of convenience, it is assumed in this embodiment that the hard disk or disks of the HDD 14 stores a main program, a communication establishing program for establishing communication with the terminal equipments 3-1 through 3-N, and a communication program for making communication with the terminal equipments 3-1 through 3-N. However, the communication establishing program, for example, may be recorded on the floppy disk 15 or the CD-ROM 17. In this case, the communication establishing program is read from the floppy disk 15 by the FDD 16 or from the CD-ROM 17 by the CD-ROM drive 18, and installed in the hard disk or disks of the HDD 14.

In addition, the communication establishing program, for example, may be installed in the hard disk or disks of the FDD 14 by on-line through the CCU 24.

Furthermore, the recording medium which provides the communication establishing program, for example, is not limited to the floppy disk 15 and the CD-ROM 17, and may be any kind of recording medium suited for storing the communication establishing program, such as a magneto-optic disk.

Of course, it is not essential for the communication establishing program to be installed in the hard disk or disks of the HDD 14, and it is possible to directly execute the communication establishing program recorded on the recording medium such as the floppy disk 15 and the CD-ROM 17.

Figure 5:
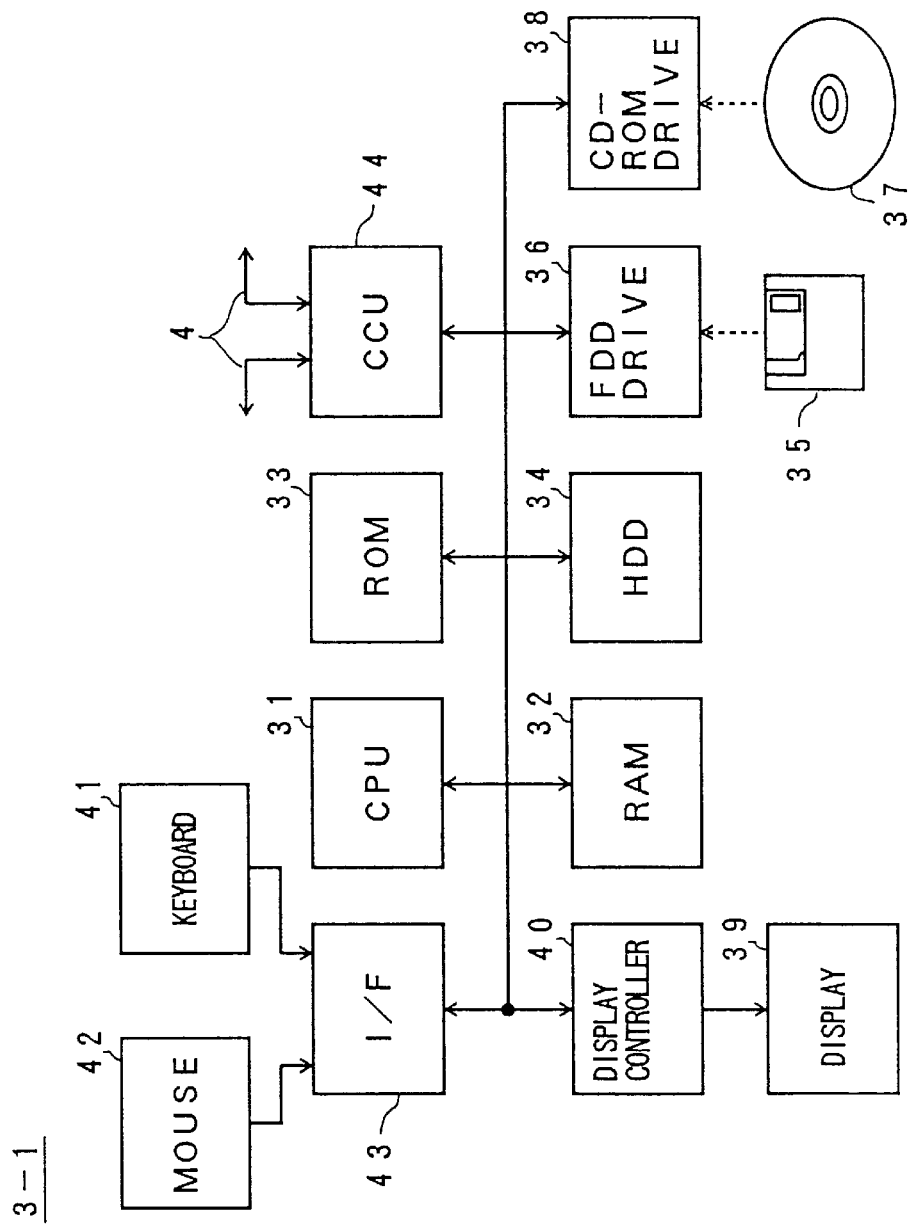
FIG. 5 is a system block diagram showing a second embodiment of the information processing apparatus according to the present invention.

FIG. 5 is a system block diagram showing a second embodiment of the information processing apparatus according to the present invention, that is, the terminal equipments 3-1 through 3-N. Only the construction of one terminal equipment 3-1 is shown in FIG. 5, because the constructions of the terminal equipments 3-1 through 3-N may be the same.

The terminal equipment 3-1 includes a CPU 31, a RAM 32, a ROM 33, a HDD 34, a FDD 36, a CD-ROM drive 38, a display 39., a display controller 40, a keyboard 41, a mouse 42, an interface (I/F) 43, and a CCU 44 which are coupled as shown in FIG. 5.

The CPU 31 carries out computation processes and carries out a general control of the terminal equipment 3-1. The RAM 32 forms a work storage region of the CPU 31, and the ROM 33 stores BIOS or the like used to start the terminal equipment 3-1. The HDD 34 includes one or more hard disks storing programs and data. The FDD 36 stores information on and reads information from a floppy disk 35 which is loaded into the FDD 36. The CD-ROM drive 38 reads information recorded on a CD-ROM 37. The display 39 displays processed information under the control of the display controller 40. The keyboard 41 and the mouse 42 are used to input commands, data and the like. The interface 43 couples the keyboard 41 and the mouse 42 to the CPU 31. The CCU 44 couples the terminal equipment 3-1 to the host computer 2, and forms a communication adapter.

For the sake of convenience, it is assumed in this embodiment that the hard disk or disks of the HDD 34 in each of the terminal equipments 3-1 through 3-N stores a main program, a communication establishing program for establishing communication with the host computer 2, and a communication program for making communication with the host computer 2. However, the communication establishing program, for example, may be recorded on the floppy disk 35 or the CD-ROM 37. In this case, the communication establishing program is read from the floppy disk 35 by the FDD 36 or from the CD-ROM 37 by the CD-ROM drive 38, and installed in the hard disk or disks of the HDD 34.

In addition, the communication establishing program, for example, may be installed in the hard disk or disks of the FDD 34 by on-line through the CCU 44.

Furthermore, the recording medium which provides the communication establishing program, for example, is not limited to the floppy disk 35 and the CD-ROM 37, and may be any kind of recording medium suited for storing the communication establishing program, such as a magneto-optic disk.

Of course, it is not essential for the communication establishing program to be installed in the hard disk or disks of the HDD 34, and it is possible to directly execute the communication establishing program recorded on the recording medium such as the floppy disk 35 and the CD-ROM 37.

A computer-readable recording medium according to the present invention stores a program for causing a computer such as the CPUs 11 and 31 to carry out the communication right determination method of the present invention. The computer-readable recording medium is not limited to a specific kind, and may be realized by any kind of recording medium capable of storing a program, such as the floppy disks 15 and 35 and the CD-ROMs 17 and 37.

Next, a description will be given of processes carried out by the communication establishing programs for establishing the communication between the host computer 2 and the terminal equipments 3-1 through 3-N.

First, a description will be given of the operation of the communication establishing program executed in the host computer 2.

Figure 6:
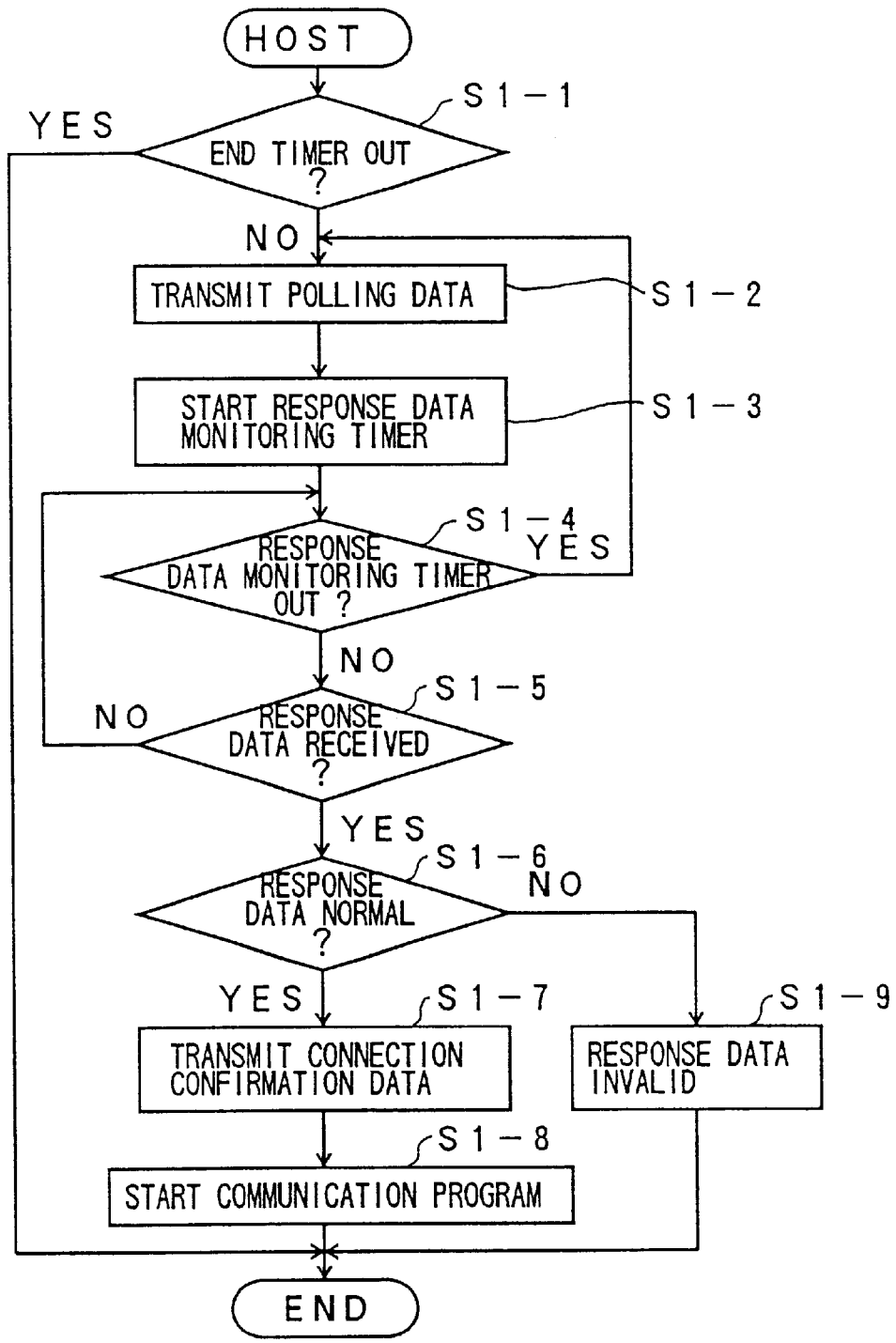
FIG. 6 is a flow chart for explaining a communication establishing program executed by the first embodiment of the information processing apparatus.

FIG. 6 is a flow chart for explaining the communication establishing program executed by the first embodiment of the information processing apparatus, that is, the host computer 2.

In FIG. 6, a step S1-1 decides whether or not a time timed by an end timer has elapsed, and a step S1-2 transmits a polling data if the decision result in the step S1-1 is NO. This end timer may be a software timer. On the other hand, the process ends if the decision result in the step S1-1 is YES. In other words, the host computer 2 transmits the polling data with respect to the terminal equipments 3-1 through 3-N until the time timed by the end timer elapses.

Figures 7, 8:
FIG. 7 is a diagram showing a data structure of a polling data generated by the first embodiment of the information processing apparatus.
FIG. 8 is a diagram showing a data structure of a connection confirmation data generated by the first embodiment of the information processing apparatus.

FIG. 7 is a diagram showing a data structure of the polling data generated by the host computer 2 in this embodiment.

As shown in FIG. 7, the polling data is formed by a 6-byte data, and has a sequence of numerical values which normally would not occur in the case of the data. For example, the first byte has a value "50" in hexagonal value, the second byte has a value "81" in hexagonal value, the third byte has a value "01" in hexagonal value, the fourth byte has a value "10" in hexagonal value, and the fifth and sixth bytes respectively have a value "FF" in hexagonal value.

Returning now to the description of FIG. 6, a step S1-3 starts a response data monitoring timer, and a step S1-4 decides whether or not a time timed by the response data monitoring timer has elapsed. This response data monitoring timer may be a software timer. If the decision result in the step S1-4 is YES, the process returns to the step S1-2 and the polling data is transmitted again.

On the other hand, if the decision result in the step S1-4 is NO, a step S1-5 decides whether or not a response data is received from one of the terminal equipments 3-1 through 3-N. The process returns to the step S1-4 if the decision result in the step S1-5 is NO. But if the decision result in the step S1-5 is YES, a step S1-6 decides whether or not the received response data is normal. In other words, the step S1-6 decides whether or not the response data is normal when the response data is received from one of the terminal equipments 3-1 through 3-N within the time timed by the response data monitoring timer.

If the decision result in the step S1-6 is YES, a step S1-7 generates and broadcasts a connection confirmation data to the terminal equipments 3-1 through 3-N. The connection confirmation data is set to a value which differs for each of the terminal equipments 3-1 through 3-N, and includes data indicating a response time required from a time when the polling data is supplied to a time when the response data is transmitted. Then, a step S1-8 starts a communication program, and the process ends.

FIG. 8 is a diagram showing a data structure of the connection confirmation data generated by the host computer 2 in this embodiment.

As shown in FIG. 8, the connection confirmation data is formed by a 6-byte data, and has a sequence of numerical values which normally would not occur in the case of the data. For example, the first byte has a value "4C" in hexagonal value, the second byte has a value "81" in hexagonal value, the third and fourth bytes respectively have data "XX" and "YY" of the response time in hexagonal value, and the fifth and sixth bytes respectively have a value "FF" in hexagonal value.

Returning now to the description of FIG. 6, a step S1-9 invalidates the response data if the decision result of the step S1-6 is NO, and the process ends. In other words, the received response data is invalidated if the response data cannot be received normally and the response data cannot be recognized due to overlap of a plurality of response data, for example.

By the above described communication establishing program of the host computer 2, the transmission of the polling data which permits the connection request with respect to the terminal equipments 3-1 through 3-N, and the transmission of the communication confirmation data which confirms the connection from the response data from the terminal equipments 3-1 through 3-N with respect to the transmitted polling data are carried out. As a result, a communication is established between the host computer 2 and a predetermined one of the terminal equipments 3-1 through 3-N.

Next, a description will be given of the process carried out by the communication establishing program of each of the terminal equipments 3-1 through 3-N.

Figure 9:
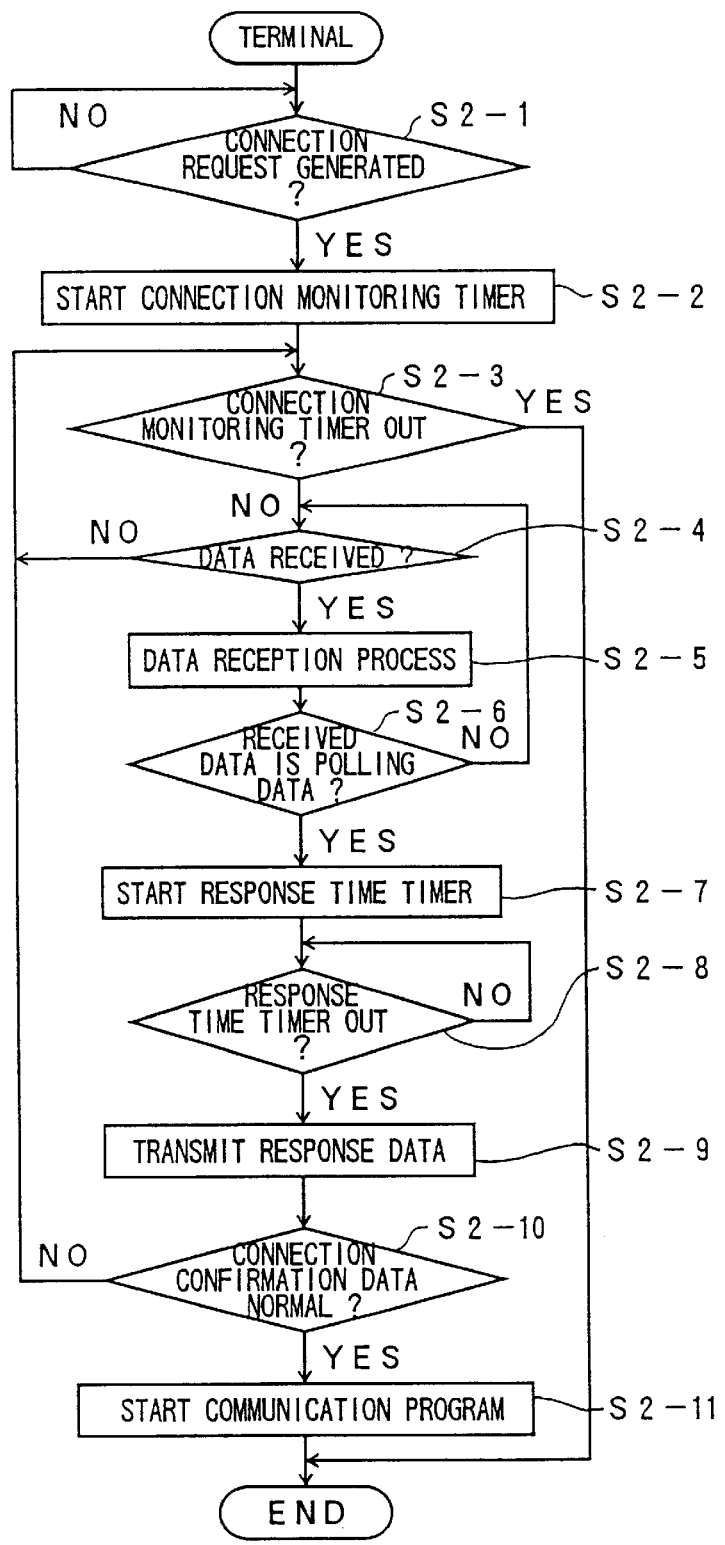
FIG. 9 is a flow chart for explaining a communication establishing program executed by the second embodiment of the information processing apparatus.

FIG. 9 is a flow chart for explaining the communication establishing program executed by the second embodiment of the information processing apparatus, that is, each of the terminal equipments 3-1 through 3-N.

In each of the terminal equipments 3-1 through 3-N, a step S2-1 shown in FIG. 9 decide whether or not a connection request is generated. If the connection request to make a connection to the host computer 2 is generated and the decision result in the step S2-1 becomes YES, a step S2-2 starts a connection monitoring timer. This connection monitoring timer may be a software timer. A step S2-3 decides whether or not a time timed by the connection monitoring timer has elapsed. If the decision result in the step S2-3 is YES, the communication establishing program is discontinued and the process ends.

If the decision result in the step S2-3 is NO, a step S2-4 decides whether or not a data is received, and the process returns to the step S2-3 if the decision result in the step S2-4 is NO. On the other hand, if the decision result in the step S2-4 is YES, a step S2-5 carries out a data reception process to analyze the received data. In other words, the data reception process is carried out if the data is received from the host computer 2 via the cable 4 within the time timed by the connection monitoring timer.

A step S2-6 decides whether or not the received data is the polling data, and the process returns to the step S2-4 if the decision result in the step S2-6 is NO. On the other hand, if the decision result in the step S2-6 is YES, a step S2-7 starts a response time timer. This response time timer may be a software timer. Then, a step S2-8 decides whether or not a response time timed by the response time timer has elapsed. If the response time timed by the response time timer elapses and the decision result in the step S2-8 becomes YES, a step S2-9 generates and transmits a response data which requests connection to the host computer 2. The response data is transmitted to the host computer 2 via the cable 4.

For example, the time when the connection is requested to the terminal equipments 3-1 through 3-N is acquired in units of 1 ms, and the response time is set to the lowest digit of the acquired time. Hence, the response time timed by the response time timer is set to 4 ms if the acquired time is 1234 ms, and the response time is set to 5 ms if the acquired time is 235 ms, for example. By setting the response time timed by the response time timer in this manner, the response time timed by the response time timer becomes variable information. For this reason, at each of the terminal equipments 3-1 through 3-N, the response time timed by the response time timer is set depending on the time when the connection request is made, and it is thus unnecessary to manage the response time at each of the terminal equipments 3-1 through 3-N. In other words, there is no need for the operators of each of the terminal equipments 3-1 through 3-N to set the response time, and the connection of the terminal equipments 3-1 through 3-N can be made at ease. In the response data, the response time to be timed by the response time timer at each of the terminal equipments 3-1 through 3-N is added as recognition information of each of the terminal equipments 3-1 through 3-N.

FIG. 10 is a diagram showing a data structure of the response data generated by the second embodiment of the information processing apparatus, that is, each of the terminal equipments 3-1 through 3-N.

As shown in FIG. 10, the response data is formed by a 6-byte data, and has a sequence of numerical values which normally would not occur in the case of the data. For example, the first byte has a value "52" in hexagonal value, the second byte has a value "81" in hexagonal value, the third and fourth bytes respectively have data "XX" and "YY" corresponding to response times t1 through tN of the terminal equipments 3-1 through 3-N in hexagonal value, and the fifth and sixth bytes respectively have a value "FF" in hexagonal value.

Returning now to the description of FIG. 9, in each of the terminal equipments 3-1 through 3-N, after transmitting the response data to the host computer 2 in the step S2-9, the receipt of a connection confirmation data transmitted from the host computer 2 is waited. A step S2-10 decides whether or not the received connection confirmation data is normal, and the process returns to the step S2-3 if the decision result in the step S2-10 is NO. On the other hand, a step S2-11 starts a communication program if the decision result in the step S2-10 is YES. In other words, the communication program is started if the connection confirmation data from the host computer 2 is normally received within the time timed by the connection monitoring timer. Whether the received connection confirmation data is normal or abnormal may be determined based on the recognition information added to the connection confirmation data received from the host computer 2. That is, it may be determined that the received connection confirmation data is normal when the recognition information added to the connection confirmation data received from the host computer 2 matches the recognition information added to the response data by the terminal equipment.

When generating the connection confirmation data, the host computer 2 adds the recognition information added to the received response data, as it is, to the connection confirmation data and transmits the connection confirmation data added with the recognition information. For this reason, there is no need for the host computer 2 to manage the recognition information of each of the terminal equipments 3-1 through 3-N.

Next, a description will be given of the operation of starting each program when establishing a communication between the host computer 2 and the terminal equipments 3-1 through 3-N, by referring to FIGS. 11 and 12.

Figure 11:
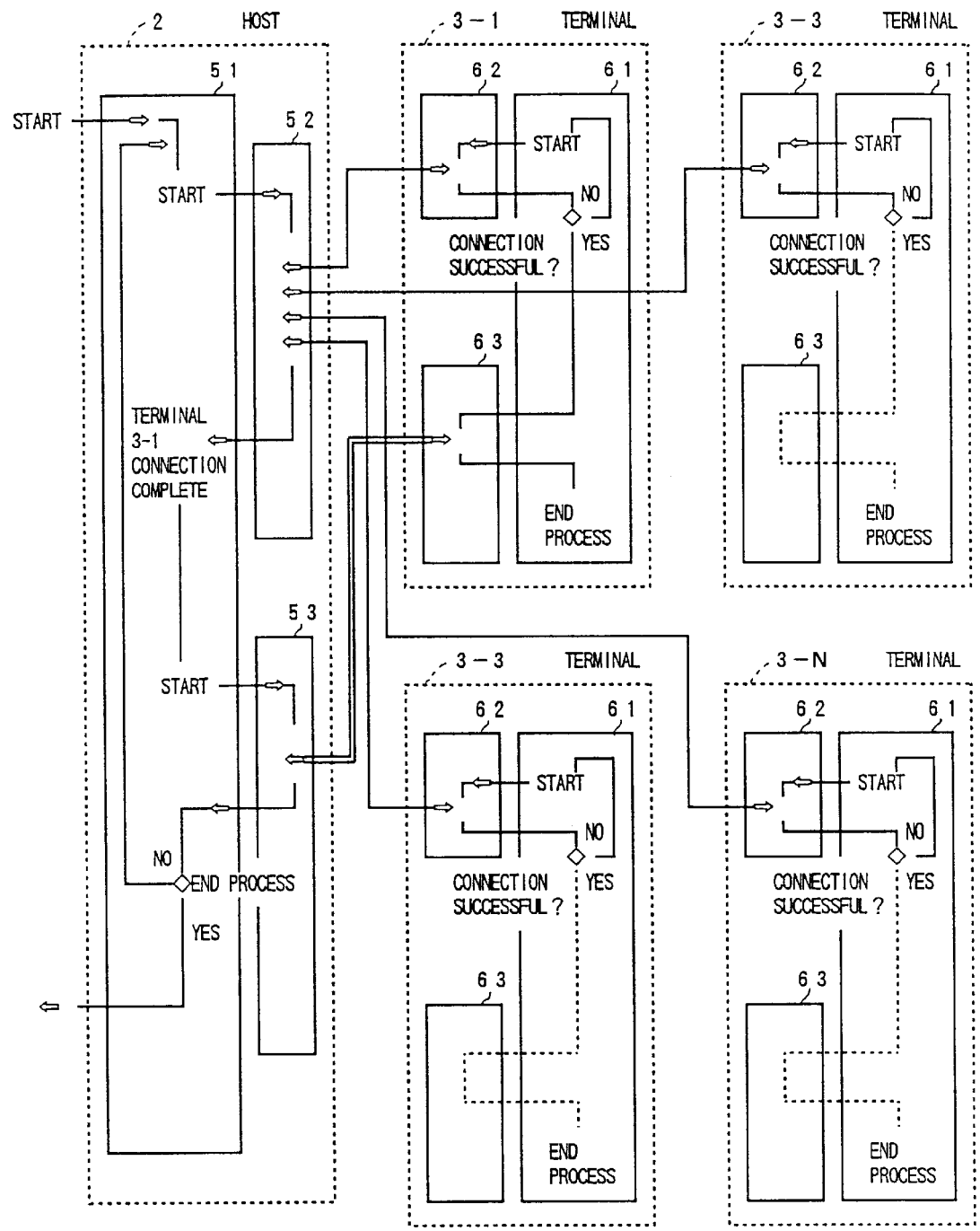
FIG. 11 is a diagram for explaining a program start operation of the embodiment of the communication right determination method.

FIG. 11 is a diagram f or explaining a program start operation of the embodiment of the communication right determination method.

First, when a main program 51 of the host computer 2 is started in FIG. 11, a communication establishing program 52 of the host computer 2 is started. According to the communication establishing program 52, the polling data is supplied to the terminal equipments 3-1 through 3-N for every predetermined time.

When the response data is received from one of the terminal equipments 3-1 through 3-N in response to the polling data as will be described later, the communication establishing program 52 of the host computer 2 notifies the main program 51 that a communication is established when the communication is established between the host computer 2 and one of the terminal equipments 3-1 through 3-N.

When the communication is established between the host computer 2 and one of the terminal equipments 3-1 through 3-N by the communication establishing program 52, the mail program 51 next starts a communication program 53. The communication program 53 makes the communication between the host computer 2 and one of the terminal equipments 3-1 through 3-N with respect to which the communication is established. When the communication between the host computer 2 and one of the terminal equipments 3-1 through 3-N ends, the communication program 53 notifies the end of the communication to the main program 51.

When the main program 51 receives the notification from the communication program 53 that the communication between the host computer 2 and one of the terminal equipments 3-1 through 3-N ended, the main program 51 again starts the communication establishing program 52. The main program 51 starts the communication establishing program 52 and establishes the communication bet ween the host computer 2 and predetermined ones of the terminal equipments 3-1 through 3-N until the process ends.

On the other hand, at each of the terminal equipments 3-1 through 3-N, a main program 61 is started, and a connection establishing program 62 is started when the main program 61 requests a communication between the terminal equipment and the host computer 2.

The communication establishing program 62 generates the response data depending on the polling data supplied from the host computer 2, and supplies the response data to the host computer 2. When a communication is established between the terminal equipment and the host computer 2, the communication establishing program 62 notifies the establishment of the communication to the main program 61.

When the main program 62 receives the notification from the communication establishing program 62 that the communication is established between the terminal equipment and the host computer 2, the main program 61 starts a communication program 63. The communication program 63 controls the communication between the terminal equipment and the host computer 2.

When the communication between the terminal equipment and the host computer 2 ends, the communication program 63 notifies the end of the communication to the main program 61, and the process ends. Responsive to the notification of the end of the communication, the main program 61 ends the process depending on the request to communicate with the host computer 2, and carries out another process.

If the communication cannot be established between the terminal equipment and the host computer 2, the communication establishing program 62 notifies the non-establishment of the communication to the main program 61. In this case, the main program 61 again starts the communication establishing program 62, so as to establish a communication between the terminal equipment and the host computer 2.

Next, a description will be given of the communication establishing operation for establishing the communication between the host computer 2 and the terminal equipments 3-1 through 3-N.

FIG. 12 is a diagram for explaining the communication establishing operation of the embodiment of the communication right determination method. In FIG. 12, the data flow is indicated by a bold solid line, and the process flow is indicated by a thin solid line.

When establishing a communication between the host computer 2 and one of the terminal equipments 3-1 through 3-N, the communication establishing program 52 of the host computer 2 supplies the polling data to the terminal equipments 3-1 through 3-N as described above. When the communication establishing program 62 is started at one of the terminal equipments 3-1 through 3-N, this communication establishing program 62 generate s the response data depending on the polling data supplied from the host computer 2. The recognition information which is set depending on the response times $t1$ through $tN$ of each of the terminal equipments 3-1 through 3-N is added to the response data which is generated by the communication establishing program 62.

For example, in a case where the communication establishing program 62 is started at each of the terminal equipments 3-1 through 3-3 as shown in FIG. 12, the terminal equipment 3-1 generates the recognition information based on the response time $t1$ and supplies the response data added with the recognition information to the host computer 2 after the response time $t1$ from the time when the polling data is received from the host computer 2. On the other hand, the terminal equipment 3-2 generates the recognition information based on the response time $t2$ and supplies the response data added with the recognition information to the host computer 2 after the response time $t2$ from the time when the polling data is received from the host computer 2, where $t2>t1$. In addition, the terminal equipment 3-2 generates the recognition information based on the response time $t3$ and supplies the response data added with the recognition information to the host computer 2 after the response time $t3$ from the time when the polling data is received from the host computer 2, where $t3>t2>t1$.

At the host computer 2, the response data which is received first after transmitting the polling data is regarded valid, and the response data received thereafter are regarded invalid. For this reason, when the response data are received from the terminal equipments 3-1 through 3-3, the response data received from the terminal equipment 3-1 is validated while the response data received from the terminal equipments 3-2 and 3-3 are invalidated, as shown in FIG. 12.

The host computer 2 generates the recognition information added to the validated response data, that is, a communication confirmation data added with the response time $t1$ which is preset with respect to the terminal equipment 3-1, and transmits the communication confirmation data to all of the terminal equipments 3-1 through 3-N. From among all of the terminal equipments 3-1 through 3-N, the communication confirmation data is received by the terminal equipments 3-1 through 3-3 in which a communication confirmation program is started. The communication confirmation program of each of the terminal equipments 3-1 through 3-3 only regards the response data added with a corresponding one of the response times $t1$ through $t3$ as being normal, and regards the response data added with the response times other than the corresponding response time as being invalid. For example, the communication confirmation program of the terminal equipment 3-1 regards the response data added with the response time $t1$ as being valid, and regards the response data added with other response times $t2$ and $t3$ as being invalid.

Accordingly, in a case where the communication establishing program of the host computer 2 validates the response data added with the response time $t1$ of the terminal equipment 3-1 as the recognition information as shown in FIG. 12, the response time $t1$ of the terminal equipment 3-1 is added as the recognition data to the communication confirmation data which is transmitted to the terminal equipments 3-1 through 3-N. Hence, this communication confirmation data is regarded as being normal in the terminal equipment 3-1, but is regarded as being invalid in the other terminal equipments 3-2 and 3-3 in which the communication confirmation program is started. As a result, the communication program is started only in the terminal equipment 3-1, and the communication between the terminal equipment 3-1 and the host computer 2 is enabled.

According to this embodiment, it is unnecessary to provide a communication adapter with respect to each of the plurality of terminal equipments. In addition, it is unnecessary to provide an ID number with respect to each of the plurality of terminal equipments, and no polling data needs to be supplied to each of the plurality of terminal equipments. Therefore, it is possible to reduce the time required to make the communication according to this embodiment.

In the embodiment described above, the present invention is applied to the communication system 1 in which the host computer 2 and the plurality of terminal equipments 3-1 through 3-N are coupled via the cables 4. However, the application of the present invention is of course not limited to the communication system 1, and the present invention is similarly applicable to other communication systems, such as optical communication systems and radio communication systems.

Figure 13:
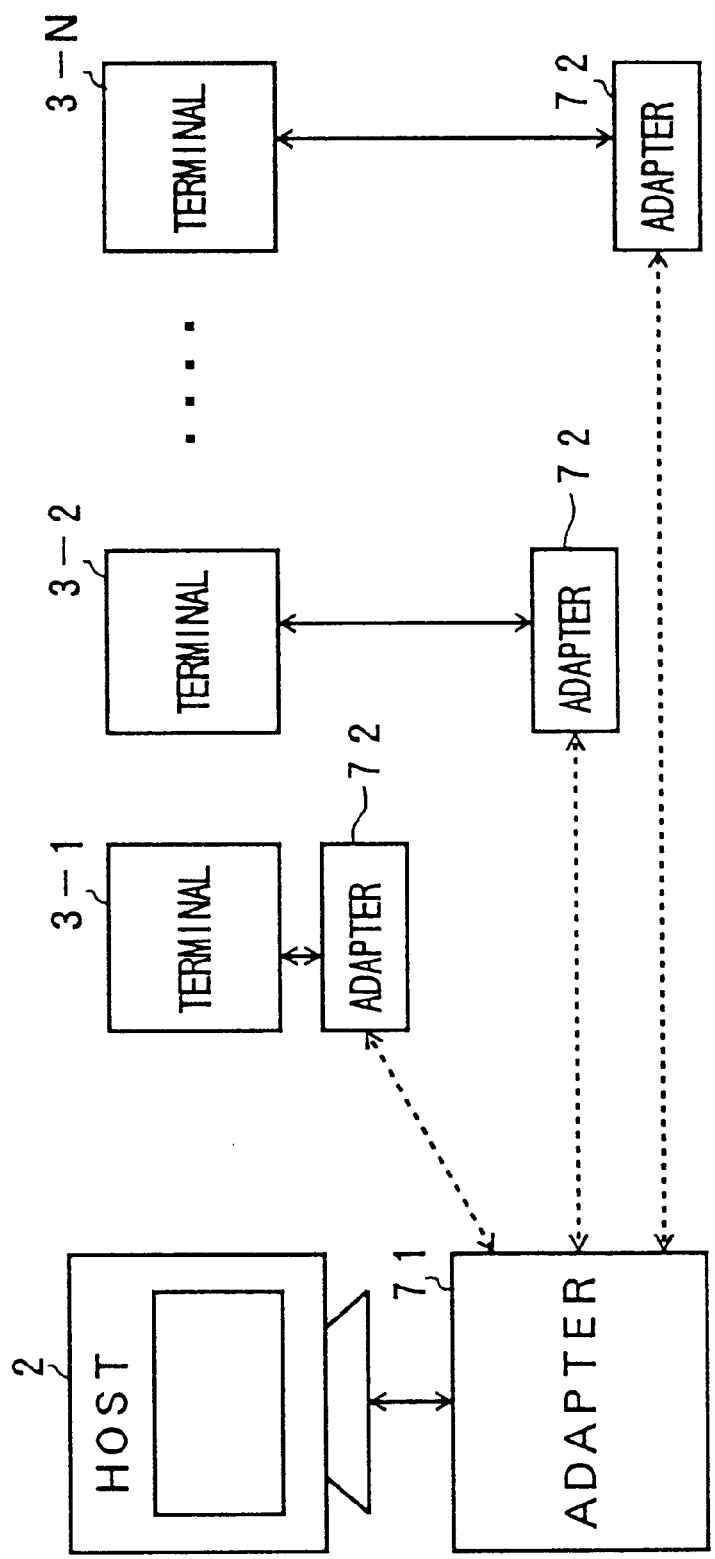
FIG. 13 is a system block diagram showing a communication system applied with a second embodiment of the communication right determination method according to the present invention.

FIG. 13 is a system block diagram showing a communication system applied with a second embodiment of the communication right determination method according to the present invention. In FIG. 13, those parts which are the same as those corresponding parts in FIG. 3 are designated by the same reference numerals, and a description thereof will be omitted.

In a communication system 70 shown in FIG. 13, the host computer 2 is coupled to an optical communication adapter 71, and each of the terminal equipments 3-1 through 3-N is coupled to an optical communication adapter 72. The host computer 2 and the terminal equipments 3-1 through 3-N are coupled via the optical communication adapters 71 and 72. In other words, the CCUs 24 and 44 shown in FIGS. 4 and 5 are respectively coupled to the optical communication adapters 71 and 72, instead of being coupled to the cables 4. As a result, in this embodiment, the host computer 2 and the terminal equipments 3-1 through 3-N are coupled via optical communication lines.

Figure 14:
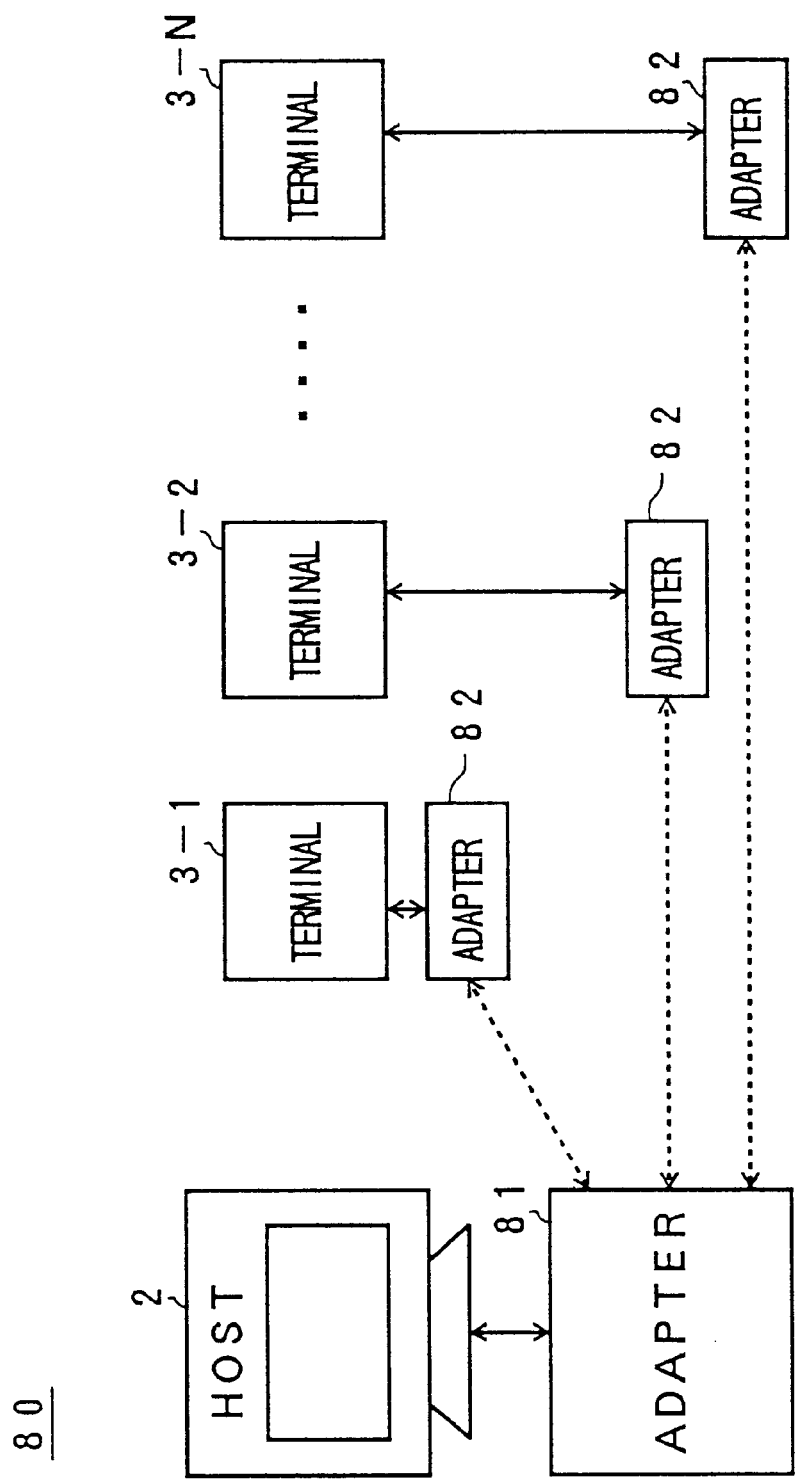
FIG. 14 is a system block diagram showing a communication system applied with a third embodiment of the communication right determination method according to the present invention.

FIG. 14 is a system block diagram showing a communication system applied with a third embodiment of the communication right determination method according to the present invention. In FIG. 14, those parts which are the same as those corresponding parts in FIG. 3 are designated by the same reference numerals, and a description thereof will be omitted.

In a communication system 80 shown in FIG. 14, the host computer 2 is coupled to a radio communication adapter 81, and each of the terminal equipments 3-1 through 3-N is coupled to a radio communication adapter 82. The host computer 2 and the terminal equipments 3-1 through 3-N are coupled via the radio communication adapters 81 and 82. In other words, the CCUs 24 and 44 shown in FIGS. 4 and 5 are respectively coupled to the radio communication adapters 81 and 82, instead of being coupled to the cables 4. As a result, in this embodiment, the host computer 2 and the terminal equipments 3-1 through 3-N are coupled via radio communication lines.

Further, the present invention is not limited to these embodiments, but various variations and modifications may be made without departing from the scope of the present invention.

What is claimed is:

1. A communication right determination method for determining a right to communicate between a host unit and a plurality of terminal equipment coupled to the host unit, comprising the steps of:
   (a) transmitting polling information from the host unit simultaneously to the plurality of terminal equipment;
   (b) transmitting connection response information from the terminal equipment to the host unit at times which are different for each of the terminal equipment depending on the polling information received from the host unit; and
   (c) establishing a communication between the host unit and a predetermined terminal equipment from among the plurality of terminal equipment depending on the connection response information which is received from each of the terminal equipments, wherein:
      said step (b) generates terminal recognition information based on a connection request time of each of the terminal equipments and transmits the terminal recognition information to the host unit by adding the terminal recognition information to the connection response information; and
      said step (c) transmits communication confirmation information which indicates an establishment of a communication, to the terminal equipments, by adding to the communication confirmation information the terminal recognition information which is added to the connection response information received from the predetermined terminal equipment.

2. The communication right determination method as claimed in claim 1, wherein said step (c) transmits the communication confirmation information to the terminal equipments by adding to the communication confirmation information the terminal recognition information which is added to connection response information which is received first from among the connection response information received by the host unit.

3. The communication right determination method as claimed in claim 1, which further comprises the steps of:
   (d) recognizing the terminal recognition information added to the communication confirmation information transmitted to the terminal equipments in said step (c), and enabling a communication between the host unit and the predetermined terminal equipment corresponding to the terminal recognition information.

4. The communication right determination method as claimed in claim 2, which further comprises the steps of:
   (e) recognizing the terminal recognition information added to the communication confirmation information transmitted to the terminal equipments in said step (c), and enabling a communication between the host unit and the predetermined terminal equipment corresponding to the terminal recognition information.

5. An information processing apparatus which communicates with a plurality of terminal equipments, comprising:
   a polling information transmitting unit which transmits polling information simultaneously to the terminal equipments; and
   a communication establishing unit which establishes a communication between the information processing apparatus and a predetermined terminal equipment from among the terminal equipments depending on connection response information which is received from each of the terminal equipments in response to the polling information and to which terminal recognition information for identifying the terminal equipments is added, said terminal recognition information being generated based on a connection request time of the terminal equipment.

6. An information processing apparatus which communicates with a plurality of terminal equipments, comprising:
    a polling information transmitting unit which transmits polling information simultaneously to the terminal equipments; and
    a communication establishing unit which establishes a communication between the information processing apparatus and a predetermined terminal equipment from among the terminal equipments depending on connection response information which is received from each of the terminal equipments in response to the polling information,
    wherein terminal recognition information for identifying the terminal equipments, which is generated based on a connection request time of a corresponding one of the terminal equipments, is added to the connection response information received from the terminal equipments, and
    said communication establishing unit transmits communication confirmation information which indicates an establishment of a communication, to the terminal equipments, by adding to the communication confirmation information the terminal recognition information which is added to the connection response information received from the predetermined terminal equipment.

7. The information processing apparatus as claimed in claim 6, wherein said communication establishing unit transmits the communication confirmation information to the terminal equipments by adding to the communication confirmation information the terminal recognition information which is added to connection response information which is received first from among the connection response information received from the terminal equipments.

8. An information processing apparatus which communicates with a host unit, comprising:
    a connection response unit which transmits connection response information to the host unit at a time which is unique to the information processing apparatus in response to, polling data received from the host unit; and
    a communication establishing unit which establishes a communication between the information processing apparatus and the host unit depending on a communication confirmation response which is received from the host unit in response to the connection response information, said connection response unit generates terminal recognition information based on a connection request time of the information processing apparatus, and transmits the terminal recognition information to the host unit by adding the terminal recognition information to the connection response information.

9. The information processing apparatus as claimed in claim 8, which further comprises:
    a communication unit which recognizes the terminal recognition information added to the communication confirmation information received from the host unit, and enables a communication between the information processing apparatus and the host unit when the recognized terminal recognition information corresponds to the information processing apparatus.

10. A computer-readable recording medium recorded with a program for causing a computer to establish a communication with a plurality of terminal equipments, comprising:
    polling information transmitting means for transmitting polling information simultaneously to the terminal equipments; and
    communication establishing means for establishing a communication between the computer and a predetermined terminal equipment from among the terminal equipments depending on connection response information which is received from each of the terminal equipments in response to the polling information and to which terminal recognition information for identifying the terminal equipments is added, said terminal recognition information being generated based on a connection request time of the terminal equipment.

11. A computer-readable recording medium recorded with a program for causing a computer to establish a communication with a plurality of terminal equipments, said program comprising:
    polling information transmitting means for causing the computer to transmit polling information simultaneously to the terminal equipments; and
    communication establishing means for causing the computer to establish a communication between the computer and a predetermined terminal equipment from among the terminal equipments depending on connection response information which is received from each of the terminal equipments in response to the polling information,
    wherein terminal recognition information for identifying the terminal equipments, which is generated based on a connection request time of a corresponding one of the terminal equipments is added to the connection response information received from the terminal equipments, and
    said communication establishing means transmits communication confirmation information which indicates an establishment of a communication, to the terminal equipments, by adding to the communication confirmation information the terminal recognition information which is added to the connection response information received from the predetermined terminal equipment.

12. The computer-readable recording medium as claimed in claim 11, wherein said communications establishing means causes the computer to transmit the communication confirmation information to the terminal equipments by adding to the communication confirmation information the terminal recognition information which is added to connection response information which is received first from among the connection response information received from the terminal equipments.

13. A computer-readable recording medium recorded with a program for causing a computer to establish a communication with a host unit, comprising:
    connection response means for transmitting connection response information to the host unit at a time which is unique to the computer in response to polling data received from the host unit; and communication establishing means for establishing a communication between the computer and the host unit depending on a communication confirmation response which is received from the host unit in response to the connection response information, said connection response means generates terminal recognition information based on a connection request time of the computer, and transmits the terminal recognition information to the host unit by adding the terminal recognition information to the connection response information.

14. The computer-readable recording medium as claimed in claim 13, which further comprises:

communication means for recognizing the terminal recognition information added to the communication confirmation response received from the host unit, and enabling a communication between the computer and the host unit when the recognized terminal recognition information corresponds to the computer.

* * * * *

UNITED STATES PATENT AND TRADEMARK OFFICE
CERTIFICATE OF CORRECTION

PATENT NO. : 6,771,656 B1
DATED : August 3, 2004
INVENTOR(S) : M. Yoshihara

It is certified that error appears in the above-identified patent and that said Letters Patent is hereby corrected as shown below:

<u>Title page,</u>
Item [54], Title, should read
-- [54] COMMUNICATION RIGHT DETERMINATION METHOD, INFORMATION PROCESSING APPARATUS USED THERFOR, AND COMPUTER-READABLE RECORDING MEDIUM RECORDED WITH PROGRAM FOR CARRYING OUT THE METHOD --

Signed and Sealed this

Twenty-first Day of June, 2005

JON W. DUDAS
*Director of the United States Patent and Trademark Office*